(12) United States Patent
Bender et al.

(10) Patent No.: US 7,243,747 B2
(45) Date of Patent: Jul. 17, 2007

(54) TRAILER PROVIDED WITH MANOEUVRING DEVICE

(75) Inventors: Helmuth Bender, Eschenburg (DE); Steffen Bender, Eschenburg (DE); Cor Beijersbergen-van Henegouwen, Bruchem (NL); Kees Jan Staats, Bennekom (NL)

(73) Assignee: Reich GmbH, Eschenburg (DE)

( * ) Notice: Subject to any disclaimer, the term of this patent is extended or adjusted under 35 U.S.C. 154(b) by 144 days.

(21) Appl. No.: 11/057,066

(22) Filed: Feb. 11, 2005

(65) Prior Publication Data
US 2005/0189155 A1    Sep. 1, 2005

(30) Foreign Application Priority Data
Feb. 12, 2004    (NL)    ...................................    1025473

(51) Int. Cl.
*B60B 39/00*    (2006.01)
*B62D 59/04*    (2006.01)
*B62D 61/12*    (2006.01)
*B60S 9/14*    (2006.01)

(52) U.S. Cl. ........................ 180/15; 180/202; 180/209
(58) Field of Classification Search .................. 180/11, 180/12, 13, 14.2, 15, 16, 199, 200, 202, 209
See application file for complete search history.

(56) References Cited

U.S. PATENT DOCUMENTS

| 1,479,215 | A | * | 1/1924 | Borst, Jr. ..................... 280/419 |
| 1,994,855 | A | * | 3/1935 | Edwards ..................... 254/419 |
| 3,282,365 | A | * | 11/1966 | McReynolds ............... 180/208 |
| 3,439,764 | A | * | 4/1969 | Kimball ....................... 180/12 |
| 3,705,638 | A | * | 12/1972 | Shock ........................ 180/14.3 |
| 3,779,328 | A | * | 12/1973 | Wollenburg ................ 180/19.2 |
| 4,616,726 | A |   | 10/1986 | Johansson |

FOREIGN PATENT DOCUMENTS

GB    2 199 793 A    7/1998

* cited by examiner

*Primary Examiner*—Lesley D. Morris
*Assistant Examiner*—Marc A. Scharich
(74) *Attorney, Agent, or Firm*—The Webb Law Firm

(57) ABSTRACT

A trailer provided with a manoeuvring device. The manoeuvring device has a pivoting frame that can be moved with respect to the chassis of a trailer, such as a caravan, and is provided at the end with a roller driven by an electric motor. This roller does not engage on one of the wheels but is itself able to function as a wheel. Lifting of the chassis of the trailer is achieved with the aid of the pivoting frame, as a result of which the existing wheels at least partially lose contact with the ground surface.

15 Claims, 3 Drawing Sheets

TRAILER PROVIDED WITH MANOEUVRING DEVICE

BACKGROUND OF THE INVENTION (1) Field of the Invention

The present invention relates to a trailer, such as a caravan, having a chassis and at least one wheel axle provided with wheels, as well as a manoeuvring device fitted close to a wheel for manoeuvring said trailer when the latter is in the uncoupled state.

(2) Description of the Related Art

A manoeuvring device of this type is generally known in the state of the art. Especially for manoeuvring heavier trailers and heavier caravans, if these have been uncoupled from the towing vehicle, constructions are used where rollers are pushed against the tyres of the wheels and are then driven round. In this way a heavy trailer can be moved independently of the towing vehicle.

If vehicles are even heavier, tandem axles are used. In order to manoeuvre such a vehicle and in particular to turn it, particularly high resistance is encountered from the non-steerable wheels of the tandem axle which are located close together. It has been found that it is not possible under all circumstances to achieve such rotation using a single motor engaging on a wheel.

An alternative would be the use of two drive rollers per side, which is found not to function in practice and is associated with appreciable costs.

U.S. Pat. No. 4,616,726 shows an articulated vehicle, wherein the rear wheels can be lifted with a lifting arm system, such that non-driven rollers engage the soil. The axis of these rollers is under an angle with the axis of the wheels, such that easy turning of the vehicle can be effected. Drive is through the front wheels.

GB 2 199 793 shows a vehicle having near its front thereof a manoeuvring device comprising a central roller to be placed between the front wheels of the vehicle and in front of those wheels. Drive is through the rear wheels. Only a single roller is used.

Neither U.S. Pat. No. 4,616,726 nor GB 2 199 793 gives a solution for the problem to rotate a tandem axled trailer.

The aim of the present invention is to avoid these problems and to provide a construction with which it is possible to manoeuvre a single- or double-axled trailer such as a caravan that has been uncoupled from a towing vehicle, including in those cases where the substrate is relatively unstable.

BRIEF SUMMARY OF THE INVENTION

According to a first aspect of the invention a trailer is provided such as a caravan having a chassis and at least two wheel axles provided with wheels as well as a manoeuvring device fitted close to a wheel for manoeuvring said trailer when the latter is in the uncoupled state, which manoeuvring device comprises a frame that pivots with respect to the chassis and is provided at one end with a roller, an electric motor driving said roller and an actuator that moves said pivoting frame with respect to said chassis, said pivoting frame being so constructed and so fitted with respect to said wheel axle or said wheel that when said actuator is operated said roller engages on the ground surface in the vicinity of said wheel and lifts the trailer, relieving the load on said wheel without said roller making contact with said wheel and wherein the roller, in the active position, is located between the wheels of the two axles that are located one behind the another.

According to a further aspect of the invention a trailer is provided such as a caravan, having a chassis and at least one wheel axle provided with wheels as well as a manoeuvring device fitted close to a wheel for manoeuvring said trailer when the latter is in the uncoupled state, which manoeuvring device comprises a frame that pivots with respect to the chassis and is provided at one end with a roller, an electric motor driving said roller and an actuator that moves said pivoting frame with respect to said chassis, said pivoting frame being so constructed and so fitted with respect to said wheel axle or said wheel that when said actuator is operated said roller engages on the ground surface in the vicinity of said wheel and lifts the trailer, relieving the load on said wheel without said roller making contact with said wheel and wherein the axis of said roller is parallel to the axis of said wheels.

According to one aspect of the invention the roller no longer engages on a tyre of one of the wheels of the trailer but the roller itself acts as a wheel. Consequently it is possible to optimise the contact surface between roller and ground. That is to say it is possible to make the roller relatively wide, which would not be practical for normal driving with a caravan. After all, the roller described above makes contact with the ground only during manoeuvring at walking pace. Of course, in certain cases it is possible for a narrow roller to suffice. By means of the present invention not only is contact with the ground provided via the roller but a lifting movement also takes place. As a result the chassis is raised off the suspension of the wheel axle or wheel axles. According to the present invention it has been found that it is not always necessary that the wheel or the wheels lift completely off the ground. Relieving the load on the wheels to an appreciable extent is already sufficient to enable manoeuvring of the trailer with the aid of the roller. Especially in the case of a turning movement the wheels will then slide relatively easily with respect to the ground surface. This is even easier if the substrate is less stable. The movable frame is preferably a pivoting frame.

According to a further aspect of the invention the direction of rolling of the trailer is exactly the same with the roller engaging the soil or the wheels engaging the soil.

As indicated above, the invention can be used with double-axled trailers, wherein the roller is located between the axles. In a double-axled trailer the spacing between the centre line of the axles is between 40 and 100 cm and more particular between 60–70 cm. In the position of use the roller preferably contacts the soil between the centre lines of these axles. By downward movement of the roller between the two wheels the load on the two wheels of the tandem axled vehicle that are located one behind the other can be relieved to such an extent that manoeuvring is easily possible. According to an advantageous variant of the invention, there is a manoeuvring device as described above on both sides of the caravan or trailer, that is to say both left and right. There is also a controller, as a result of which it becomes possible to turn corners by applying a different speed and/or direction of rotation. This controller is preferably provided with a remote control, which may or may not be a wireless remote control.

According to a preferred embodiment of the invention the roller is displaced somewhat inwardly relative to the longitudinal centre line of the trailer relative to the position of the wheels. The centre of the roller can be about 10–90 cm nearer to the longitudinal centre line of the trailer than the wheels and is preferably about 50 cm nearer to the longitudinal centre line thereof.

According to a further embodiment of the invention the rotational axis of the roller is substantially parallel to the rotational axis of each of said wheels.

According to an advantageous embodiment of the present invention, the main frame has a longitudinal runner provided with a pivot support mounted some distance away on one side thereof, said pivoting frame extending from said support to the other side of said longitudinal runner and said roller is mounted on said other side.

According to a further variant of the present invention, the construction is made such that the roller essentially does not protrude below the chassis of the caravan in the travelling position with the towing vehicle coupled up. This can be achieved by allowing the pivoting frame to move past the main frame.

BRIEF DESCRIPTION OF THE DRAWINGS

The invention will be explained in more detail below with reference to an illustrative embodiment shown in the drawing. In the drawing.

DETAILED DESCRIPTION OF THE INVENTION

Figure 1:
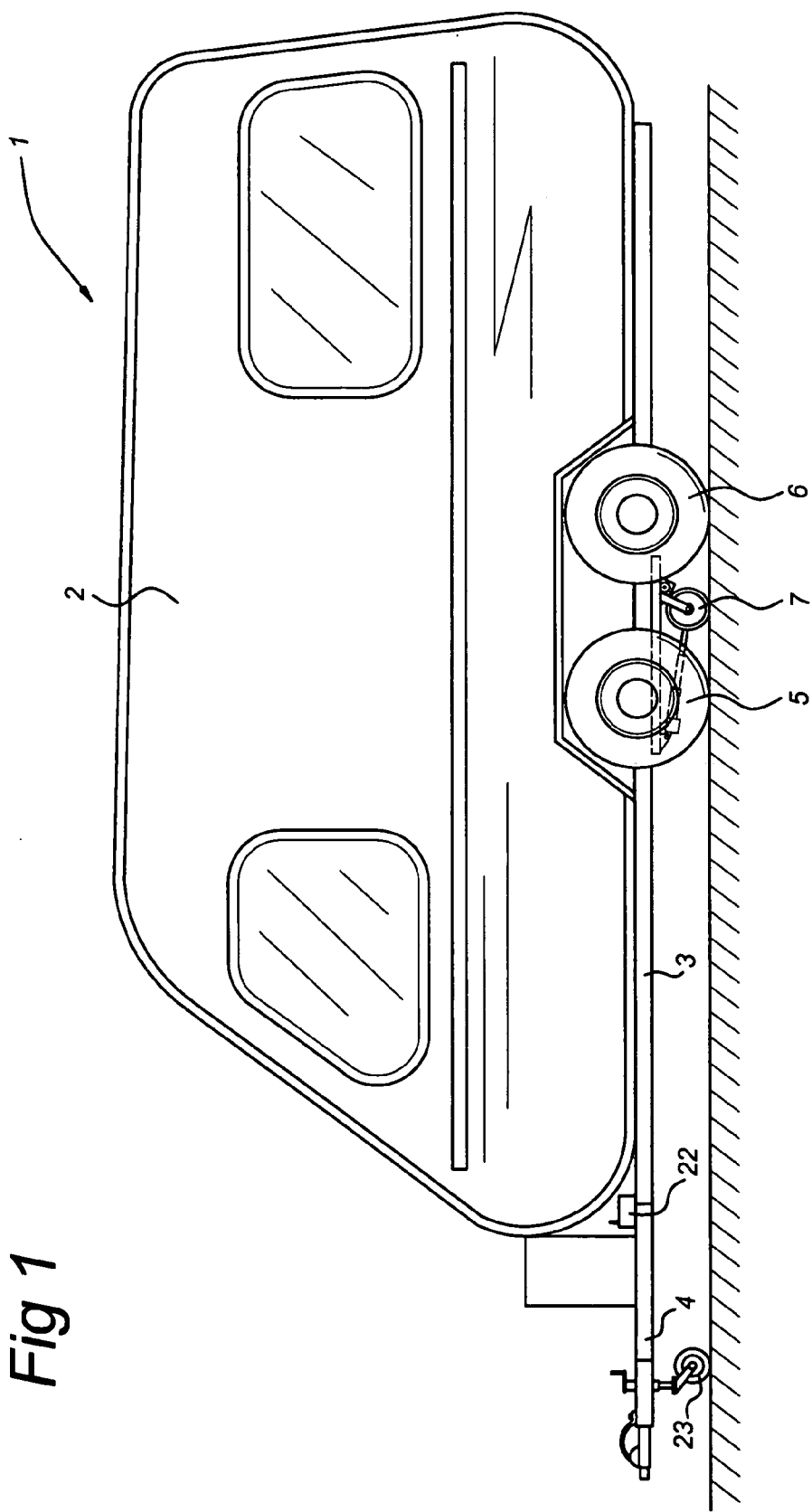
FIG. 1 shows, diagrammatically in side view, a caravan provided with the manoeuvring device according to the invention.

In FIG. 1 a caravan is indicated by 1. It must be understood that the present invention is also applicable to a wide variety of other sorts of trailers that do not have their own drive without a towing vehicle. The caravan 1 is provided with a superstructure 2 and a chassis 3. At the front the chassis 3 merges into a drawbar 4 on which a nose wheel 23 is fitted. The caravan shown here is a tandem axled caravan and is provided with wheels 5 and 6 located close to one another, 7 indices a roller that is able to move between the wheels, as is indicated in more detail on the basis of FIGS. 2 and 3. There is a roller of this type on both sides of the caravan and the drive and movement thereof is controlled by a common controller 22.

Figure 2:
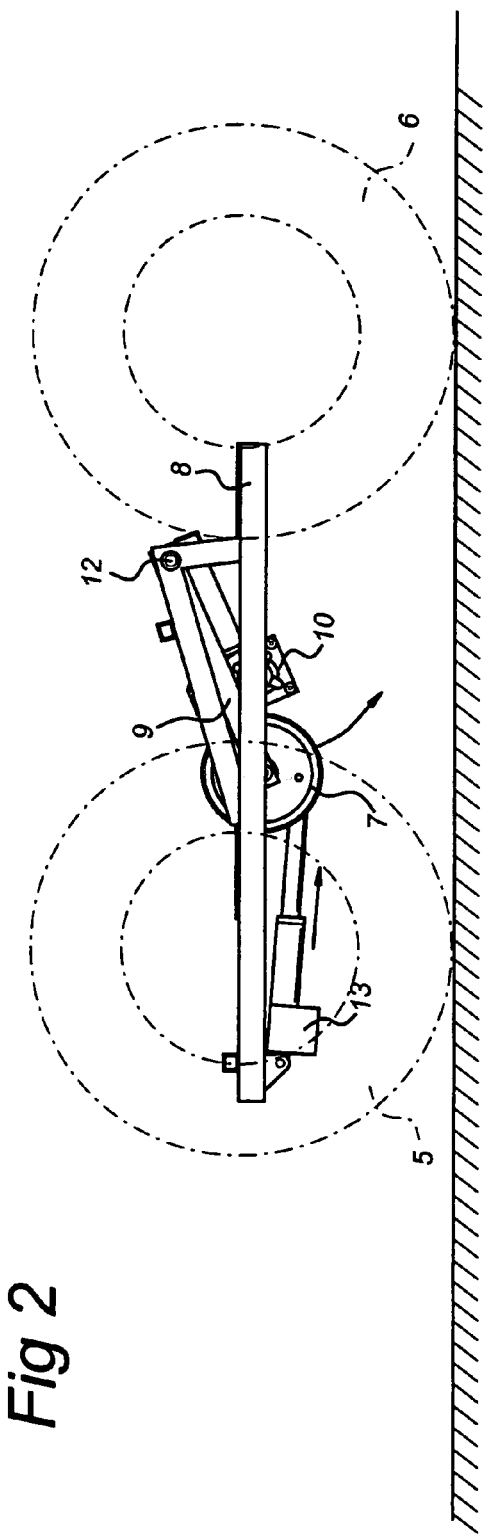
FIG. 2 shows a detail of the construction shown in FIG. 1, where the manoeuvring device is in the retracted position.

In FIG. 2 it is indicated that such a roller 7 is attached via a pivot 20 to a pivoting frame 9 such that it can turn. A motor 10 is also fixed to said pivoting frame 9. This motor is preferably an electric motor and the motor 10 and the roller 7 are coupled in some way or other known in the state of the art (chain, gear or shaft).

The pivoting frame 9 is connected to a pivot 12, which pivot 12, on the other hand, bears in a raised structure 11 on a longitudinal runner 21. Raised structure 11 and longitudinal runner 21 form part of a main frame 8. As can be seen from FIG. 4, main frame 8 is provided with fixing plates 16 for fixing to the chassis of a caravan or other trailer. It must be understood that the construction of the main frame can be integrated in the chassis 3 of the trailer so that a separate construction is not necessary.

There is an actuator 13 that, on the one hand, is fixed to the main frame 8 and more particularly the longitudinal runner 21 such that it can pivot and, on the other hand, engages on the pivot 20 of the roller 7. Movement of the actuator takes place in the direction of arrow 14. The actuator 13 can be a hydraulic, pneumatic or electric actuator. In the latter case the movement can be achieved with the aid of an electrically driven threaded rod, which can optionally be made telescopic.

Figure 4:
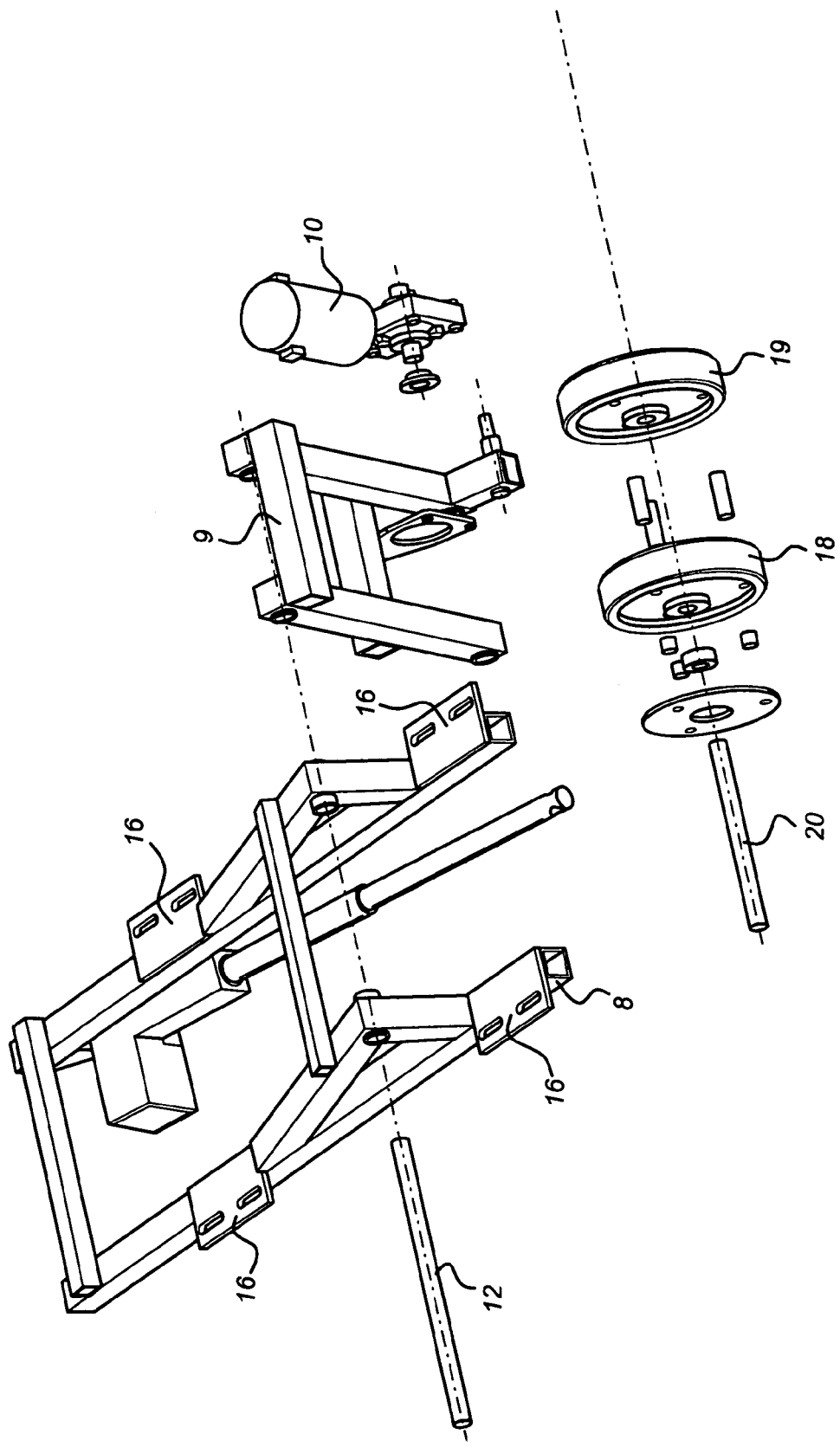
FIG. 4 shows the manoeuvring device according to the present invention in components.

As can be seen from FIG. 4, the roller 7 consists of a first roller part 18 and a second roller part 19. The surface thereof is always so made that maximum grip on the ground surface is provided. The complete roller 7 can have an appreciable width. A width of 20 cm is mentioned as an example. The diameter can likewise be approximately 20 cm. When the caravan is in the "normal", that is to say traveling, position the roller is in the position shown in FIG. 2. Because the pivoting frame 9 can pivot inside the main fame 8, when the frame is in the retracted position the actuator 13 and the roller 7 will not protrude or will hardly protrude below the chassis 3 of the vehicle, so that the ground clearance thereof is not adversely affected.

Figure 3:
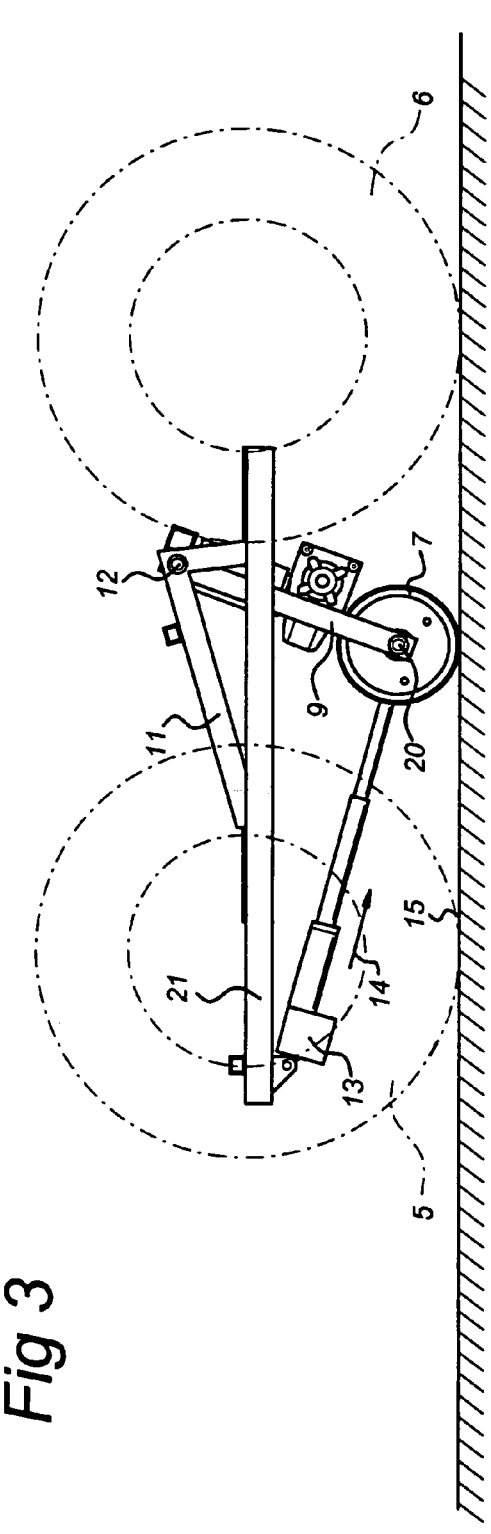
FIG. 3 shows the manoeuvring device as shown in FIG. 2 in the working position.

Once the trailer has been uncoupled from the towing vehicle the roller 7 can become active. For this purpose the actuator 13 is operated and the roller 7 moves into the position as shown in FIG. 3. During this movement the distance from the pivot 20 of the roller 7 with respect to the longitudinal runner 21 becomes greater, which results in lifting of the main frame 8 and thus the chassis 3. As a result the wheels 5 and 6 are lifted off the suspension when the roller 7 comes into contact with the ground 15. If the roller 7 is then driven, manoeuvring of the trailer can be achieved. Because the weight of the trailer is mainly transmitted to the ground via the roller 7, contact of the wheels 5 and 6 with the ground is slight, so that these will easily slide over the ground.

Although the invention has been described above with reference to a preferred embodiment, it must be understood that numerous modifications can be made without going beyond the scope of the present invention. In particular, combination with other constructions known in the state of the art is possible. Moreover, the actuator that is always present for operating a roller can be replaced by another lifting mechanism with levers and the like. Moreover, a common actuator with associated lever mechanism can be used in order to drive two rollers located opposite one another. These and further modifications fall within the scope of the appended claims.

The invention claimed is:

1. A trailer having a chassis and at least two wheel axles provided with wheels as well as a manoeuvring device fitted close to a wheel for manoeuvring said trailer when the latter is in an uncoupled state, which manoeuvring device comprises a pivoting frame that pivots with respect to the chassis and is provided at one end with a roller connected to the pivoting frame by a pivot, an electric motor driving said roller and an actuator that moves said pivoting frame with respect to said chassis, said pivoting frame being so constructed and so fitted with respect to said wheel axle or said wheel that when said actuator is operated said roller engages on a ground surface in a vicinity of said wheel and lifts the trailer, relieving a load on said wheel without said roller making contact with said wheel and wherein the roller, in an active position, is located between the wheels of the two axles that are located one behind another.

2. The trailer according to claim 1, wherein an axis of said roller is parallel to an axis of said wheels.

3. The trailer according to claim 1, wherein said roller is positioned nearer to a longitudinal centre axis of said trailer than said wheel.

4. The trailer according to claim 1, wherein lifting is performed in such a way that the load on an adjacent wheel is relieved but the wheel stays in contact with the ground surface.

5. The trailer according to claim 4, wherein lifting is performed in such a way that the load on each of the wheels is relieved but each wheel stays in contact with the ground surface.

6. The trailer according to claim 5, having a controller for the independent operation of the electric motor for executing a turning movement.

7. The trailer according to claim 1, comprising a main frame having a longitudinal runner provided with a pivot support mounted some distance away on one side of said longitudinal runner, said pivoting frame extending from said support to the other side of said longitudinal runner and said roller is mounted on said other side.

8. The trailer according to claim 1, comprising a main frame having a longitudinal runner and when the pivoting frame is completely retracted the pivot of said roller is essentially coincident with said longitudinal runner.

9. A trailer having a chassis and at least one wheel axle provided with wheels as well as a manoeuvring device fitted close to a wheel for manoeuvring said trailer when the latter is in an uncoupled state, which manoeuvring device comprises a pivoting frame that pivots with respect to the chassis and is provided at one end with a roller connected to the pivoting frame by a pivot, an electric motor driving said roller and an actuator that moves said pivoting frame with respect to said chassis, said pivoting frame being so constructed and so fitted with respect to said wheel axle or said wheel that when said actuator is operated said roller engages on a ground surface in a vicinity of said wheel and lifts the trailer, relieving a load on said wheel without said roller making contact with said wheel and wherein an axis of said roller is parallel to an axis of said wheels, wherein the trailer further comprises at least two wheel axles and wherein the roller, in an active position, is located between the wheels of the two axles that are located one behind another.

10. The trailer according to claim 9, wherein said roller is positioned nearer to a longitudinal centre axis of said trailer than said wheel.

11. The trailer according to claim 9, wherein lifting is performed in such a way that the load on an adjacent wheel is relieved but the wheel stays in contact with the ground surface.

12. The trailer according to claim 9, wherein lifting is performed in such a way that the load on each of the wheels is relieved but each wheel stays in contact with the ground surface.

13. The trailer according to claim 12, wherein two rollers are provided, each having an electric motor for driving the respective roller, and a controller being provided for the independent operation of both electric motors for executing a turning movement.

14. The trailer according to claim 9, comprising a main frame has having a longitudinal runner and when the pivoting frame is completely retracted the pivot of said roller is essentially coincident with said longitudinal runner.

15. A trailer having a chassis and at least one wheel axle provided with wheels as well as a manoeuvring device fitted close to a wheel for manoeuvring said trailer when the latter is in an uncoupled state, which manoeuvring device comprises a pivoting frame that pivots with respect to the chassis and is provided at one end with a roller connected to the pivoting frame by a pivot, an electric motor driving said roller and an actuator that moves said pivoting frame with respect to said chassis, said pivoting frame being so constructed and so fitted with respect to said wheel axle or said wheel that when said actuator is operated said roller engages on a ground surface in a vicinity of said wheel and lifts the trailer, relieving a load on said wheel without said roller making contact with said wheel and wherein an axis of said roller is parallel to an axis of said wheels, wherein the trailer further comprises a main frame with a longitudinal runner provided with a pivot support mounted some distance away on one side of said longitudinal runner, said pivoting frame extending from said support to the other side of said longitudinal runner and said roller is mounted on said other side.

* * * * *